United States Patent Office 3,301,763
Patented Jan. 31, 1967

3,301,763
METHOD FOR PREPARING ACTINIDE OXIDE FUEL PARTICLES AND ARTICLE THEREOF
Ronald L. Beatty, Clinton, and Hans Beutler, Oak Ridge, Tenn., assignors to the United States of America as represented by the United States Atomic Energy Commission
No Drawing. Filed Apr. 28, 1966, Ser. No. 546,490
6 Claims. (Cl. 176—67)

The invention described herein was made in the course of, or under, a contract with the U.S. Atomic Energy Commission.

The present invention relates generally to reactor fuels and more particularly to a method for preparing actinide oxide fuel particles and article thereof.

In the manufacture of nuclear fuel particles various coating materials have been employed to afford containment of the fuel cores. Pyrolytic carbon has been found to be an especially suitable material for such coatings and has been employed in multi-layer coatings so as to provide optimum containment. A recent development with multiple carbon coated particles has demonstrated that if the inner carbon deposit is a low density (highly porous) material, a region of high void fraction is provided for retention of fission gases thereby reducing the internal pressure and strain on the outer coating which generally comprises a high density impervious pyrolytic carbon coating.

Where pyrolytic carbon is employed as an outer impermeable coating for these fuel particles, the coating should be of a high density and low anisotropy. The term anisotropy as meant herein is defined as the ratio of the thermal expansion coefficients in the directions perpendicular and parallel to the plane of deposition. In order to achieve these specific properties it is required for high gas flows and high gas efficiencies that the deposition be conducted at temperatures above about 2000° C. While pyrolytic carbon coatings having these properties may be deposited on, for example, carbide fuel particles without attendant problems, a serious problem exists in the case of oxide fuel particles in that the oxide core has been found to undergo reaction with the carbon coating at such high temperatures employed for depositing this high density, low anisotropy pyrolytic carbon coatings. It is desirable to provide actinide oxide fuel particles which have inner low density, porous carbon coatings with high density, low anisotropy carbon coatings.

It is therefore an object of this invention to provide a method for preparing actinide oxide particles having multiple coatings.

Another object is to provide a method for preparing actinide oxide particles having an inner low density porous carbon coating and an outer high density, low anisotropy pyrolytic carbon coating.

Still another object is to provide a method for coating actinide oxide particles with pyrolytic carbon coatings at temperatures above 2000° C.

A further object is to provide novel reactor oxide fuel particles.

These and other objects which will be apparent to those skilled in the art are accomplished by interposing a thin gas impermeable layer of material, such as pyrolytic carbon, within the low density, porous coating prior to depositing the final high density outer pyrolytic carbon coatings. More specifically, a first low density, highly porous carbon coating is deposited upon the oxide fuel core and the coating parameters adjusted to lay down a thin high density gas impermeable layer of pyrolytic carbon of about 10 microns thickness. Thereafter the coating parameters are adjusted to resume deposition of the low density, highly porous carbon coating to provide an overall desired thickness of low density carbon coating as an intermediate coating and finally an outer coating of high density, low anisotropy carbon is deposited at temperatures above about 2000° C. to provide the multi-carbon coated fuel particles. Applicants found that when pyrolytic carbon coatings were deposited on bare actinide oxide fuels at temperatures above about 1600° C., the oxide core reacted with carbon to form CO and carbides. This deleterious reaction would be observed to occur where low density, highly porous carbon coatings were placed over the oxide fuel cores prior to depositing the pyrolytic carbon, inasmuch as the porous coating would not preclude passage of the CO from the core region.

It is quite unexpected that the layer of only about 10 microns affords these advantageous results. Previous experiments with uncoated actinide oxide fuel particles demonstrated that a coating thickness of at least 50 microns was required to insure that the coating did not rupture during subsequent exposure to temperatures of above 2000° C. Inasmuch as this thin sealer layer serves only as a fabricational aid, i.e., is useful in enabling a final high density carbon coating to be applied at high temperatures but is destroyed during irradiation, it is highly beneficial that this result is achieved without adding excessive coating volume to the fuel particles. Furthermore, by being positioned within the low density porous coating region, the specific properties of the pyrolytic carbon coating need not be as carefully controlled as where it would be positioned adjacent to the final outer coating for compatibility purposes such as, for example, insuring similar coefficients of thermal expansion of the various coatings. Thus, actinide oxide fuel particles having heretofore unattainable coating properties are prepared by this method.

The actinide oxide fuel particles in accordance with this invention comprise an oxide fuel core, a first low density, highly porous carbon coating surrounding the fuel core, a thin high density pyrolytic carbon coating disposed onto the first low density carbon coating, a second low density, highly porous carbon coating deposited onto the thin pyrolytic carbon layer and an outer layer of high density, low anisotropy pyrolytic carbon coating.

In a preferred embodiment oxide fuel particles of 275 micron diameter are coated with a first porous layer of 25 microns, a 10 micron layer of pyrolytic carbon, a second porous layer of 25 microns and an outer dense pyrolytic carbon layer of 60 microns, resulting in a total coating thickness of 120 microns.

In carrying out the invention actinide oxide fuel particles such as uranium, plutonium, thorium or mixed oxides thereof are charged into a fluidized bed reactor and brought up to a selected deposition temperature. A hydrocarbon gas, which is used as a decomposable source of carbon, is then introduced into the fluidized bed reactor. With respect to the low density, highly porous coating, it is preferred that undiluted acetylene gas be employed as the hydrocarbon and fluidizing gas and be deposited at a temperature of 1050° C. While the thickness of the low density porous coatings is not critical, it has been found that for optimum protection of the outer coating during irradiation the porous coating should be of at least 50 microns. The particular properties of the low density, porous coating may vary widely and depends upon the coating parameters employed. The effect of deposition parameters on coating properties for such low density porous coatings has been disclosed in detail in copending application S.N. 538,923, filed on March 29, 1966 in the names of Hans Beutler et al. for "Method for Applying Low Density Carbon Coatings."

The coating operation is then interrupted to deposit a thin layer of pyrolytic carbon on the deposited first porous layer. For this the coating gas which comprised undiluted acetylene gas for the porous deposition is adjusted to a mixture of acetylene and helium and the deposition temperatures raised to 1150° C. Under these conditions a 10 micron thick layer of pyrolytic carbon is achieved in about 15 minutes. It should be noted here that, whereas a pyrolytic carbon coating could not be applied to the fuel particles at temperatures above 2000° C., a pyrolytic layer of carbon at this lower temperature, i.e., 1150° C., is achieved without any conversion of the oxide fuel core to the carbide occurring.

After the thin sealer layer of pyrolytic carbon is deposited, the coating operation is again interrupted and the coating gas restored to undiluted acetylene gas as employed for the first porous coating. A deposition temperature of 1050° C. is used and this phase continued until about a 25 micron thick porous coating is laid down.

As a final step, a dense impermeable layer of pyrolytic carbon is deposited as an outer coating. For this the deposition temperature is raised to 2000° C. and methane gas substituted for the acetylene gas to achieve this outer coating which is of about 60 microns in thickness.

Having thus described the present invention in a general fashion, the following example is provided to illustrate the quantitative aspects and procedures in greater detail.

*Example*

A charge of 33 grams of 275 micron thoria-urania spherical particles having a surface area of 725 cm.$^2$ was placed in a 1-inch pyrolytic carbon coating furnace and brought up to a bed temperature of 1050° C. while fluidizing with helium. Temperature measurements were made by an optical pyrometer. Undiluted acetylene gas, at room temperature, was introduced into the bottom of the coater at a flow rate of 6 cm.$^3$/min.-cm.$^2$ to initiate carbon deposition having a low density (0.6 gram/cc.) and high porosity. This phase was continued until a coating thickness of about 25 microns was achieved, requiring about 0.5 minute.

At this point the acetylene gas flow was interrupted and a mixture of acetylene and helium comprising 10% of acetylene and 90% helium was introduced into the coater. The bed temperature was raised to 1150° C. and a thin layer of pyrolytic carbon having a density of about 2 grams/cc. was deposited at a flow rate of 0.5 cm.$^3$/min.-cm.$^2$.

After applying this thin sealer coating of pyrolytic carbon, a second low density (0.6 gram/cc.) was applied at a flow rate of 6 cm.$^3$/min.-cm.$^2$ acetylene (undiluted) and a temperature of 1050° C. to a thickness of about 25 microns.

Methane gas at a flow rate of 0.6 cm.$^3$/min.-cm.$^2$ was then substituted for the acetylene gas and the temperature of the bed of particles raised to 2000° C. A final layer of pyrolytic carbon was applied to the porous carbon coated fuel particles to a thickness of about 60 microns. The average density of this final pyrolytic carbon coating was 1.9 grams/cc.

The coated fuel particles were then examined by microradiography and metallography.

It should be noted that while no irradiation data was available, the thin pyrolytic carbon layer under irradiation would rupture, thus providing the full volumetric area of the low density, porous coating for fission gas retention and insulation against fission recoil damage.

What is claimed is:

1. A method for preparing actinide oxide fuel particles having multiple carbon coatings comprising the steps of depositing a first low density, highly porous carbon coating onto the oxide fuel cores, depositing a thin high density impermeable layer of material onto said porous coating, depositing a second low density, highly porous carbon coating onto said thin high density layer and thereafter depositing a high density outer coating of pyrolytic carbon onto said porous coating at temperatures of above 2000° C.

2. The method of claim 1 wherein said low density, highly porous carbon coating is deposited employing undiluted acetylene gas at a deposition temperature of 1050° C. and a flow rate of 6 cm.$^3$/min.-cm.$^2$.

3. The method of claim 1 wherein said thin high density impermeable layer comprises pyrolytic carbon deposited with a gaseous mixture of acetylene and helium at a deposition temperature of 1150° C. and a flow rate of 0.5 cm.$^3$/min.-cm.$^2$.

4. The method of claim 1 wherein said high density outer pyrolytic carbon is deposited employing methane gas at a deposition temperature of 2000° C. and at a flow rate of 0.6 cm.$^3$/min.-cm.$^2$.

5. An actinide oxide fuel particle comprising a fuel core; a first low density, highly porous carbon coating surrounding the fuel core; a thin high density pyrolytic carbon coating disposed about said first low density carbon coating, a second low density, highly porous carbon coating surrounding said thin pyrolytic carbon coating; and an outer high density pyrolytic carbon coating.

6. The article of claim 5 wherein said thin pyrolytic carbon coating has a thickness of about 10 microns.

References Cited by the Examiner

UNITED STATES PATENTS

| | | | |
|---|---|---|---|
| 3,151,037 | 9/1964 | Johnson et al. | 264—0.5 X |
| 3,243,349 | 3/1966 | Goeddel | 176—67 |
| 3,247,008 | 4/1966 | Finicle | 176—91 X |

OTHER REFERENCES

A.E.C. Report—BMI 1624, April 1, 1963, Dayton et al., pp. L–7 to L–10.

Reactor Core Materials, 1963–1964, vol. 6, No. 4, p. 26.

Nuclear Science and Engineering, Goeddel, 1964, vol. 20, pp. 214–218.

BENJAMIN R. PADGETT, *Primary Examiner.*

M. J. SCOLNICK, *Assistant Examiner.*